US 6,564,823 B1

(12) United States Patent
Mankins

(10) Patent No.: US 6,564,823 B1
(45) Date of Patent: May 20, 2003

(54) METHOD AND APPARATUS FOR TESTING PLUMBING INSTALLATIONS

(76) Inventor: John M. Mankins, 1261 Cass Ave., Cayucos, CA (US) 93430

( * ) Notice: Subject to any disclaimer, the term of this patent is extended or adjusted under 35 U.S.C. 154(b) by 0 days.

(21) Appl. No.: 09/428,596

(22) Filed: Oct. 27, 1999

Related U.S. Application Data

(60) Continuation-in-part of application No. 09/034,880, filed on Mar. 4, 1998, now Pat. No. 6,161,563, which is a division of application No. 08/777,407, filed on Dec. 30, 1996, now Pat. No. 5,740,830.

(51) Int. Cl.[7] ............................ F16K 43/00; G01M 3/04; F16L 55/11
(52) U.S. Cl. .................. 137/318; 15/104.09; 15/104.33; 73/46; 73/49.1; 73/49.5; 73/49.8; 137/15.14; 137/68.27; 137/68.3; 138/90; 408/127; 408/227
(58) Field of Search ..................... 137/15.11, 15.13, 137/15.14, 318, 247.47, 247.51, 68.27, 68.3; 73/40.5 R, 46, 49.1, 49.5, 49.6, 49.8; 4/679, 680, 681; 138/89, 90, 94; 15/104.3, 104.31, 104.33, 104.095

(56) References Cited

U.S. PATENT DOCUMENTS

| | | | | |
|---|---|---|---|---|
| 396,177 A | | 1/1889 | Smith ........................ 137/318 |
| 2,417,082 A | * | 3/1947 | Mapes et al. ............. 137/68.27 |
| 2,756,486 A | | 7/1956 | Smith ........................ 137/318 |
| 2,972,915 A | | 2/1961 | Milanovits et al. ......... 137/318 |
| 3,272,033 A | | 9/1966 | Leopold, Jr. et al. ....... 137/318 |
| 3,335,742 A | | 8/1967 | Novak ........................ 137/318 |
| 3,598,141 A | | 8/1971 | Yamo ........................ 137/318 |
| 3,646,954 A | | 3/1972 | Hutton ...................... 137/318 |
| 3,779,263 A | * | 12/1973 | Edwards et al. .......... 137/68.27 |
| 3,834,580 A | * | 9/1974 | Ludwig et al. ........... 137/68.27 |
| 3,845,879 A | * | 11/1974 | Dernbach et al. ........ 137/68.27 |
| 3,928,885 A | | 12/1975 | Peterson et al. ........... 15/104.3 |
| 4,128,107 A | | 12/1978 | Blumhardt .................. 137/318 |
| 4,216,793 A | | 8/1980 | Volgstadt et al. ........... 137/318 |
| 4,364,140 A | * | 12/1982 | Irwin ....................... 15/104.33 |
| 4,429,568 A | | 2/1984 | Sullivan ...................... 138/90 |
| 4,475,566 A | | 10/1984 | Haines ........................ 137/318 |
| 4,587,859 A | | 5/1986 | Coombes et al. ........... 137/318 |
| 4,598,731 A | | 7/1986 | Colson ........................ 137/318 |
| 4,611,624 A | | 9/1986 | Snyder ........................ 137/318 |
| 4,626,142 A | | 12/1986 | Brin et al. .................... 408/81 |
| 4,761,024 A | | 8/1988 | Ewen ........................ 137/318 |
| 4,838,447 A | * | 6/1989 | Albracht et al. .......... 137/68.27 |

(List continued on next page.)

Primary Examiner—George L. Walton
(74) Attorney, Agent, or Firm—Leo F. Costello

(57) ABSTRACT

A method and apparatus for testing plumbing installations including a tool for making an opening through a test cap or other blockage in a fluid-carrying line of a plumbing system. The tool and cap make the testing method possible. During the rough-in plumbing phase of construction, a test cap welded in the drain pipe seals the drain line from the sewer line at the location of the clean-out. Thereafter, the rough-in plumbing system is tested by pressurizing the system through the clean-out on the building side of the cap. Following successful completion of this test, the top-out plumbing is completed, leaving the test cap welded in place. After the roof vents are in, the top-out test of the plumbing system is made, also through the clean-out. After final test and inspection, a special tool constructed in accordance with the present invention is inserted down the clean-out to penetrate and ream-out the test cap. The test cap used is specially constructed to facilitate use of the tool, and the tool has an operating head especially adapted to access the test cap and to penetrate and ream an opening through the cap. Thereafter, the tool including the head is readily withdrawn from the clean-out. Moreover, the tool is easily lengthened or shortened to suit particular applications and users. The tool may also be useful in opening a passage through other blockages in a fluid-carrying line.

21 Claims, 6 Drawing Sheets

U.S. PATENT DOCUMENTS

| | | | |
|---|---|---|---|
| 4,936,350 A | 6/1990 | Huber | 138/90 |
| 5,033,510 A | 7/1991 | Huber | 138/90 |
| 5,044,393 A | 9/1991 | Jiles | 137/318 |
| 5,056,176 A * | 10/1991 | Belcher | 15/104.095 |
| 5,163,480 A | 11/1992 | Huber | 138/90 |
| 5,199,129 A * | 4/1993 | Salecker et al. | 15/104.33 |
| 5,418,997 A | 5/1995 | DeFrange | 15/104.31 |
| 5,620,020 A | 4/1997 | Collins | 137/318 |
| D379,851 S | 6/1997 | Mathison | D23/260 |
| 6,182,704 B1 | 2/2001 | Bevacco | 138/89 |

* cited by examiner

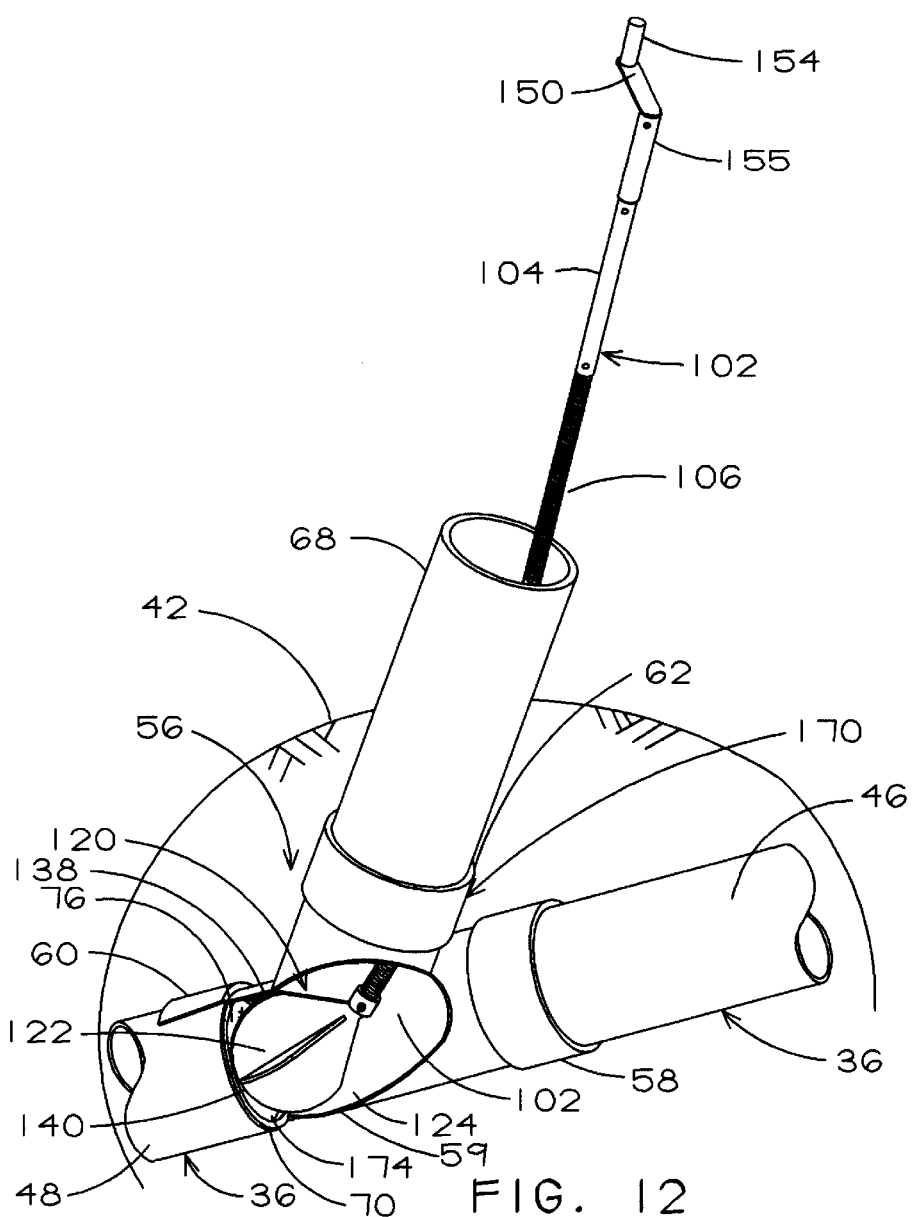
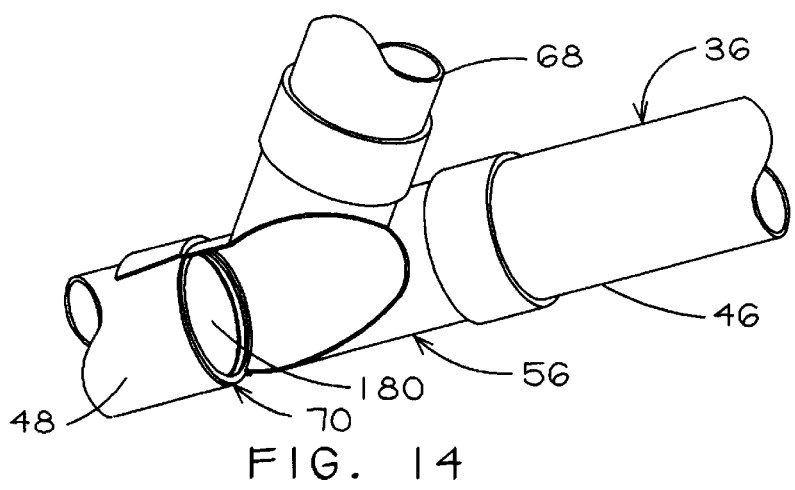

METHOD AND APPARATUS FOR TESTING PLUMBING INSTALLATIONS

CROSS-REFERENCE TO RELATED APPLICATION

This application is a continuation-in-part of my application Ser. No. 09/034,880, now U.S. Pat. No. 6,161,563, filed Mar. 4, 1998 which in turn is a divisional of my parent application Ser. No. 08/777,407 filed Dec. 30, 1996, now U.S. Pat. No. 5,740,830.

FIELD

The present invention pertains to a method and apparatus for testing plumbing installations and more particularly to a tool for making an opening through a test cap or other blockage in a fluid-carrying line of a plumbing system and to an improved method for testing a plumbing installation wherein the tool and cap make the testing method possible.

BACKGROUND

In residential house construction and as is well known, the plumbing is basically installed in three stages, namely, the rough-in plumbing, top-out plumbing and finish plumbing. The rough-in plumbing occurs prior to pouring of concrete. Top-out plumbing follows framing the building and involves installing the pipes in the walls and vent pipes that extend up through the roof of the structure. Finish plumbing relates to setting toilets, sinks, and the like.

The rough plumbing includes laying a drain or waste pipe which leads from building to the city sewer main normally in the access street or road adjacent to the building. It is, thus, common practice to insert a clean-out in the drain pipe between the pipes in the building and the section of the drain pipe that leads to the sewer line. This clean-out may be located in a basement or, in a building without a basement, outside the building and underground. If underground, the clean-out has a branch extending to the surface of the ground for providing access to the drain pipe both during construction and during use of the building.

As is well known, in order to pass the rigid inspection normally imposed by building codes, it is necessary to test the drainage part of the plumbing system after the rough-in and top-out stages are finished. For this purpose, common procedures and devices are in use. The devices include test caps and inflatable test plugs, so-called water-weenies. In use, the test caps are sealed at the ends of all open and exposed branch pipes, and the inflatable test plugs are used in the clean-out where the passageway plugged is not as accessible. After the tests, the exposed test caps are punched out with a hammer, and the inflatable plugs are deflated and pulled out of the clean-out. Thus, the test plugs and the inflatable plugs can be removed without disassembling and disturbing the tested system.

As indicated, the test caps in above-ground, accessible locations are usually knocked out with a hammer, whereupon the fragments are pried out with a screwdriver or pliers. If a test cap were sealed in a clean-out, however, whether the clean-out is relatively accessible in a basement or whether it is underground, it cannot be punched out with a hammer and screwdriver without disassembling part of the system and thereby disturbing the tested system. Thus, test caps have not been used to block the test pressure in the drain pipe.

Instead, during the rough-in plumbing stage, the inflatable weenie-shaped, test plugs have been inserted in the clean-out, used for the tests, and subsequently removed with a pull chain attached to the plug and extending out of the clean-out. More specifically, to test the rough-in plumbing, the plug is inserted and inflated thereby sealing the drain pipe. The plumbing on the building side of the plug is then pressurized to check for leaks. After the top-out phase is completed, the plumbing is again tested by again inflating the plug, and pressurizing the system, usually by feeding water into the system through the vent pipes in the roof.

Use of such inflatable weenie plugs for the described testing has proved unsatisfactory for several reasons. The essential problem is that the plugs often leak although the plumbing may be entirely sound. Either the plug does not seal perfectly circumferentially within the pipe or the plug is punctured as it is being slid in or out of the clean-out and against the rough surfaces thereof. As a result, the test fails, not because of faulty plumbing, but because of a faulty plug. The plumbing crew will then need to be called back to the job to attend to the problem, causing aggravation and extra expense to the contractors and owners involved. Not only is there extra labor cost involved, but the failed inflatable test plugs must be replaced at considerable expense.

SUMMARY

A method and apparatus for testing plumbing installations is provided including a tool for making an opening through a test cap or other blockage in a fluid-carrying line of a plumbing system. The tool and cap make the testing method possible. During the rough-in plumbing phase of construction, a test cap welded in the drain pipe seals the drain line from the sewer line at the location of the clean-out. Thereafter, the rough-in plumbing system is tested by pressurizing the system through the clean-out on the building side of the cap. Following successful completion of this test, the top-out plumbing is completed, leaving the test cap welded in place. After the roof vents are in, the top-out test of the plumbing system is made, also through the clean-out. After final test and inspection, a special tool constructed in accordance with the present invention is inserted down the clean-out to penetrate and ream-out the test cap. The test cap used is specially constructed to facilitate use of the tool, and the tool has an operating head especially adapted to access the test cap and to penetrate and ream an opening through the cap. Thereafter, the tool including the head is readily withdrawn from the clean-out. Moreover, the tool is easily lengthened or shortened to suit particular applications and users. The tool may also be useful in opening a passage through other blockages in a fluid-carrying line.

An object of this invention is to be able to open a passage through a test cap or other blockage in a fluid-carrying line.

Another object is to provide a tool that can be extended into a clean-out and can penetrate through and ream out a test cap or other blockage that is secured or stuck in a fluid-tight manner in a drain pipe to which the clean-out is connected.

Still another object is to be able from a remote position to maneuver and guide the operating head of a tool inside a clean-out and into a position therein to penetrate and ream out a test cap welded in the clean-out or other blockage in the line.

An additional object is to be able to do the rough-in and final pressure tests of a plumbing system in a building under construction through a clean-out instead of through a roof vent or other internal pipe of the building.

A further object is to provide a tool for penetrating and reaming an opening through a test cap or other blockage in a drain line wherein the tool is adapted to flex more easily around corners or other transitions between a clean-out and the drain line and thereby make an opening through the test cap or other blockage.

An additional object is to provide a test cap for blocking a drain line that can be more easily removed by a tool especially adapted to penetrate and ream out the cap through a clean-out.

Another object is to provide an operating head on a plumbing tool that is especially adapted to penetrate through and ream out an opening through a test cap in a drain line.

Yet another object is to provide a test cap- or other blockage-removing tool that can be adjusted in length depending on the distance between the test cap-to-be-removed and the location of the operator of the tool.

A further object to provide a test cap-removing tool that cooperates with a clean-out to leverage the operating head into an operating position and then allows the operating head to penetrate and ream through the test cap or other blockage.

A still further object is to enable a test plug or other blockage that has been welded or otherwise fixed in fluid-tight relation in a drain pipe to be removed so that nearly the full diameter of the drain pipe is available for conducting material therethrough after the plug or other blockage has been removed.

These and other objects and advantages of the invention will become apparent upon reference to the accompanying drawings and the following detailed description.

DESCRIPTION OF THE DRAWINGS

FIG. 12 is an isometric view similar to and on the same scale as FIG. 3 with an extension pipe connected to the clean-out, with the tool of FIGS. 7a and 7b extended into the clean-out, and with part of the clean-out broken away to show the operating head of the tool pivots in order to move into operating engagement with the center plate of the test cap.

FIG. 14 is a view similar to FIG. 12 but with the tool removed and with the clean-out broken away to show how the operating head has completely removed the center plate of the test cap thereby to open the drain pipe for movement of drain materials therethrough.

DETAILED DESCRIPTION

Figure 1:
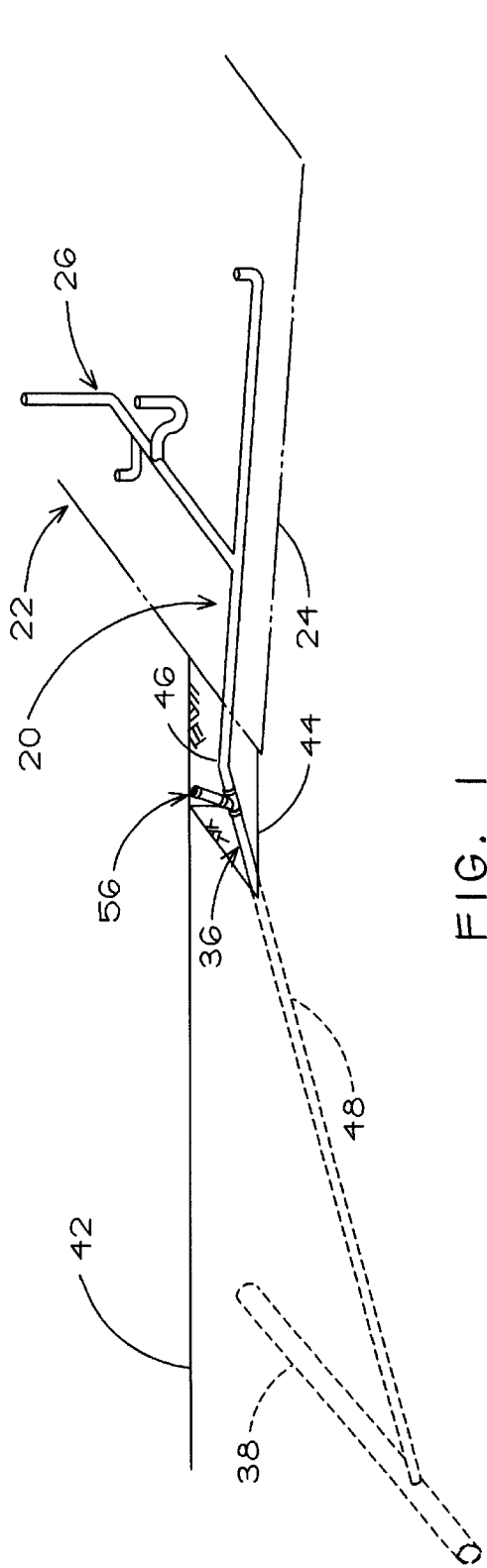
FIG. 1 is an isometric view showing a schematic representation of a plumbing installation in a residential building construction that is intended to represent the plumbing installation after the rough-in plumbing or first stage of the plumbing installation has been completed and during which a clean-out is installed in a drain pipe leading from the building to a public sewer line.

Prior to describing the method and apparatus of the present invention, reference will be briefly made to the environment in which the invention is used. Thus, in FIG. 1, a plumbing system is schematically shown and generally indicated by the numeral 20 in a residential building construction 22, with the plumbing system being represented at the rough plumbing stage. Only the foundation area 24 and a few of the interior pipes 26 of the plumbing system are shown, thereby indicating that only the basic pipes have been installed and that none of the finish plumbing is in nor are the appliances installed.

During the rough-in plumbing stage (FIG. 1), a drain pipe 36 is connected between the interior plumbing 26 and a city sewer main or public sewer line 38 which usually runs underneath the street or road in front of the construction 22. The drain pipe is typically made of a plastic such as ABS or PVC, but it may be cast iron or copper or other suitable material. For drainage purposes, the pipe usually has a three- or four-inch diameter and is laid with enough slope to enable drainage. As is well known, the ground 42 around the construction is excavated to provide a large trench or open area 44 below normal ground level so the drain pipe can be connected to the sewer line. The drain pipe has an upper section 46 connected to the interior plumbing and a lower section 48 connected to the sewer line.

Figure 2:
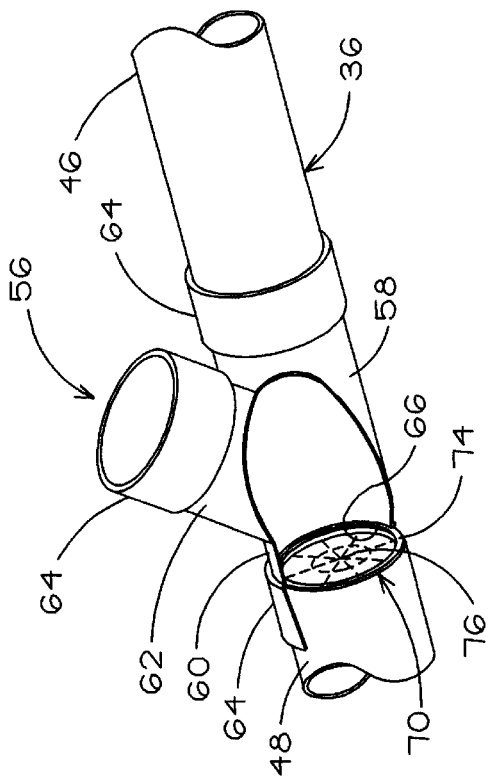
FIG. 2 is an enlarged exploded isometric view of a part of FIG. 1, showing fragments of upper and lower sections of the drain pipe, showing the clean-out with a branch thereof partially broken away to be connected to the lower section of the drain pipe, and showing a test cap to be connected to the lower section between the section and the branch of the clean-out.

A three-way clean-out 56 (FIGS. 1, 2 and 3), usually of the same material as the drain pipe 36, has inlet, outlet and clean-out branches 58, 60 and 62, each having a collar 64 and an annular shoulder 66. The collars of the inlet and outlet branches are respectively slid over and cemented to the upper and lower sections 46 and 48 of the drain pipe with the shoulders of the clean-out normally abutting the ends of the pipe sections. A riser 68 is connected to the clean-out branch and extends above the surface of the ground 42, and a clean-out cover 69 is releasably connected to the riser for sealing and closing this branch when necessary. Note also that the clean-out may be a wye as shown, but also a sanitary tee or a combination, that is, a two way, clean-out, the latter two types not being shown.

A feature of the present invention is the use of an inlet nipple 69a in the cover 69 that is closed by a removable cap 69b. When opened by removing the cap, the nipple provides fluid communication into the riser 68 and thus to the clean-out 56 for a purpose to be described. This nipple may be offset from the wrench lug on the cover, as shown, or it may be coaxial with the cover. The important characteristic is that the nipple provides a way of feeding water into the plumbing system 20 through the clean-out at the appropriate time, as will be seen.

As is well-known, building codes typically require plumbing installations for new construction to be tested for leaks twice: after the rough-in plumbing is in and after the top-out plumbing is completed. It has been standard practice to insert an inflatable plug, not shown, down the clean-out branch 62 and into the outlet branch 60; to inflate the plug; and thus to block the drain pipe 36 so the plumbing system can be pressurized for leaks. Since such plugs have not been satisfactory as discussed above, the principles of the present invention involve conducting the tests differently.

In accordance with the method of the present invention, as part of the rough-in plumbing phase (FIGS. 1–5) and before installing the clean-out 56, a test cap, plug or disc 70 of special construction and also known as a "knock-out disc," is fitted in and glued to the lower section 48 of the drain pipe 36. Thereafter, the clean-out is connected between and joins the upper and lower sections 46 and 48 of the drain pipe. The test cap has an annular body 72, an annular flange 74 extending radially outwardly from the body, and a flat, circular center plate 76 filling the body. The center plate is divided into several pie-shaped or triangular segments 80 with adjacent segments being divided by straight weakened break lines or grooves 82 that meet in the center 84 of the plate. The plate may also have one or more circular, weakened break lines or grooves 85a (FIG. 4a) concentric with the annular body and flange; if singular, such a circular break line would preferably have a radius from about ⅓ to ½ of the radius of the annular body and flange or if multiple, the break lines 85b (FIG. 4b) would be preferably be about equally spaced between the center 84 and the flange. Alternatively and also not shown, the plate may have only circular break lines in which case, the center plate may be concavo-convex, instead of flat, with the concave side facing upstream.

Test caps, or knock-out plugs as they are commonly called, for a similar purpose are sold by the PASCO Company of 11156 Wright Road, Lynwood, Calif. 90262, as part Nos. 4844 and 4845. Since the weakened break lines 82 in the cap 70 facilitate penetration by the subject tool 100, the caps 70 are preferred over the identified PASCO caps. The caps 70 are made of the same plastic material as the PASCO caps and are thus capable of being solvent-welded to ABS or PVC pipe. The caps 70 are also made in various sizes so that their annular bodies 72 can be fitted in three- or four-inch diameter drain pipes 36.

Figure 13:
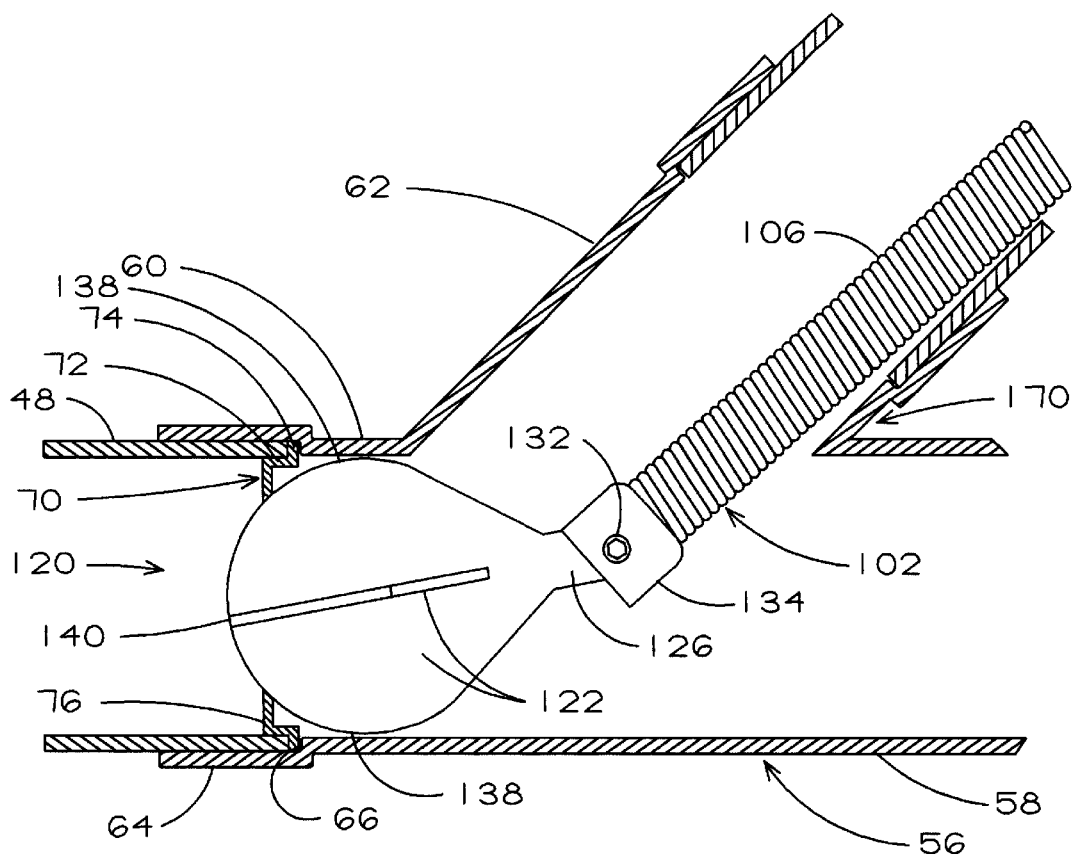
FIG. 13 is an enlarged fragmentary, vertical longitudinal section of the clean-out and part of the lower section of the drain pipe and showing the tool with its operating head pivoted relative to the shaft of the tool and penetrating the center plate of the cap in position to ream an opening through the cap.

As above stated and during the rough-in plumbing stage, the test cap 70 (FIGS. 2 and 5) is fitted in the lower section 48 of the drain pipe 36 with the body 72 received within the pipe, the flange 74 engaging the end of the pipe, and the center plate 76 disposed transversely of and within the pipe. Prior to making this assembly, layers of a suitable bonding cement are applied as at 78 to the mating surfaces so as to solvent-weld the parts together in the described assembly. After the test cap is welded in place (FIG. 13), the collar 64 of the outlet branch 60 of the clean-out is slipped over and solvent-welded to the lower section of the drain pipe with the shoulder 66 of the outlet branch abutting the radial flange 74 of the test cap. The resulting connection (FIG. 3) of the test cap in the drain pipe effects a fluid-tight seal that will block flow through the pipe. Either before or after this connection, the inlet branch 58 of the clean-out is connected to the upper section 46 of the drain pipe.

Following the described assembly (FIGS. 1 and 3) of the test cap 70, the clean-out 56, and the upper and lower sections 46 and 48 of the drain pipe 36, the rough-in plumbing is subjected to a first pressure test. In accordance with the present invention, such pressurization is accomplished by removing the cap 69b and connecting a hose, not shown, to the nipple 69a. The hose is connected to a source of water under pressure, and water is introduced under pressure into the plumbing system 20 through the clean-out 56. It is, of course, understood and well known that all open ends of the pipes in the system 20 are plugged and, of course, the cover 69 closes the riser 68 of the clean-out branch 62, except for the nipple. Pressurization through the clean-out is made possible by bonding the test cap in place as described above, in contrast with using water-weenies as described above and pressurizing the system through a pipe in the building 22. The presence of a water weenie in the clean-out and drain line would of course make pressurizing the system through the clean-out impossible.

Such pressurization imposes fluid pressure on the upstream side of the test cap 70 (FIGS. 1 and 3), that is, on the side of the test cap opposite from the sewer line 38. Since the test cap is securely bonded in fluid-tight relation within the drain pipe 36, no leaks will occur through or around the test cap. As a result, if there is any loss of pressure during the test, it will clearly be in the plumbing system 20 itself and not in the failure of the test cap, as contrasted with the frequent leaks of inflatable test plugs, as described above.

Figure 6:
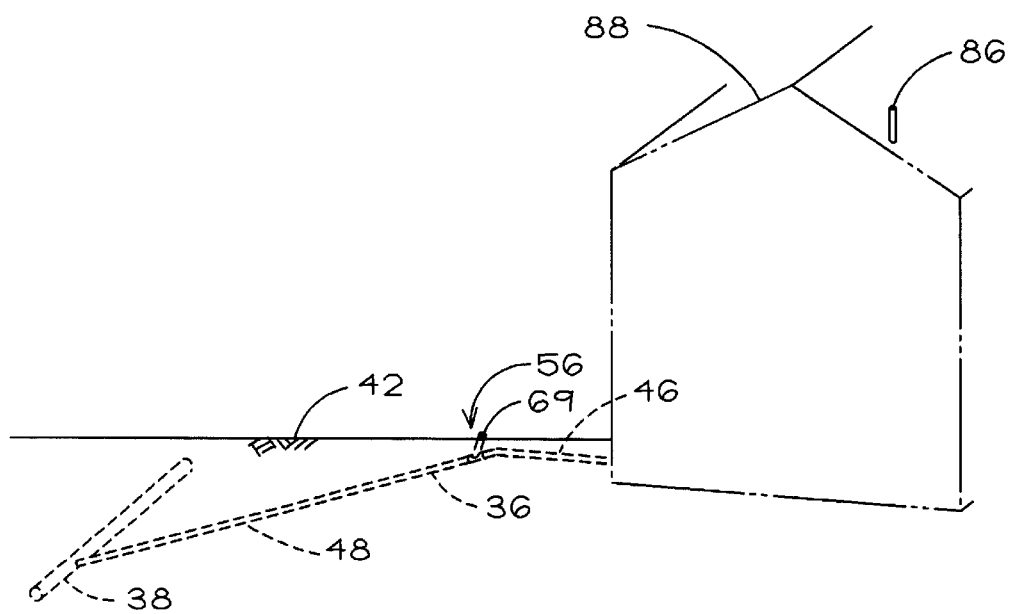
FIG. 6 is a view similar to FIG. 1 but on a reduced scale and intended to represent the plumbing system after the second or top-out stage thereof has been completed.
Figure 7:
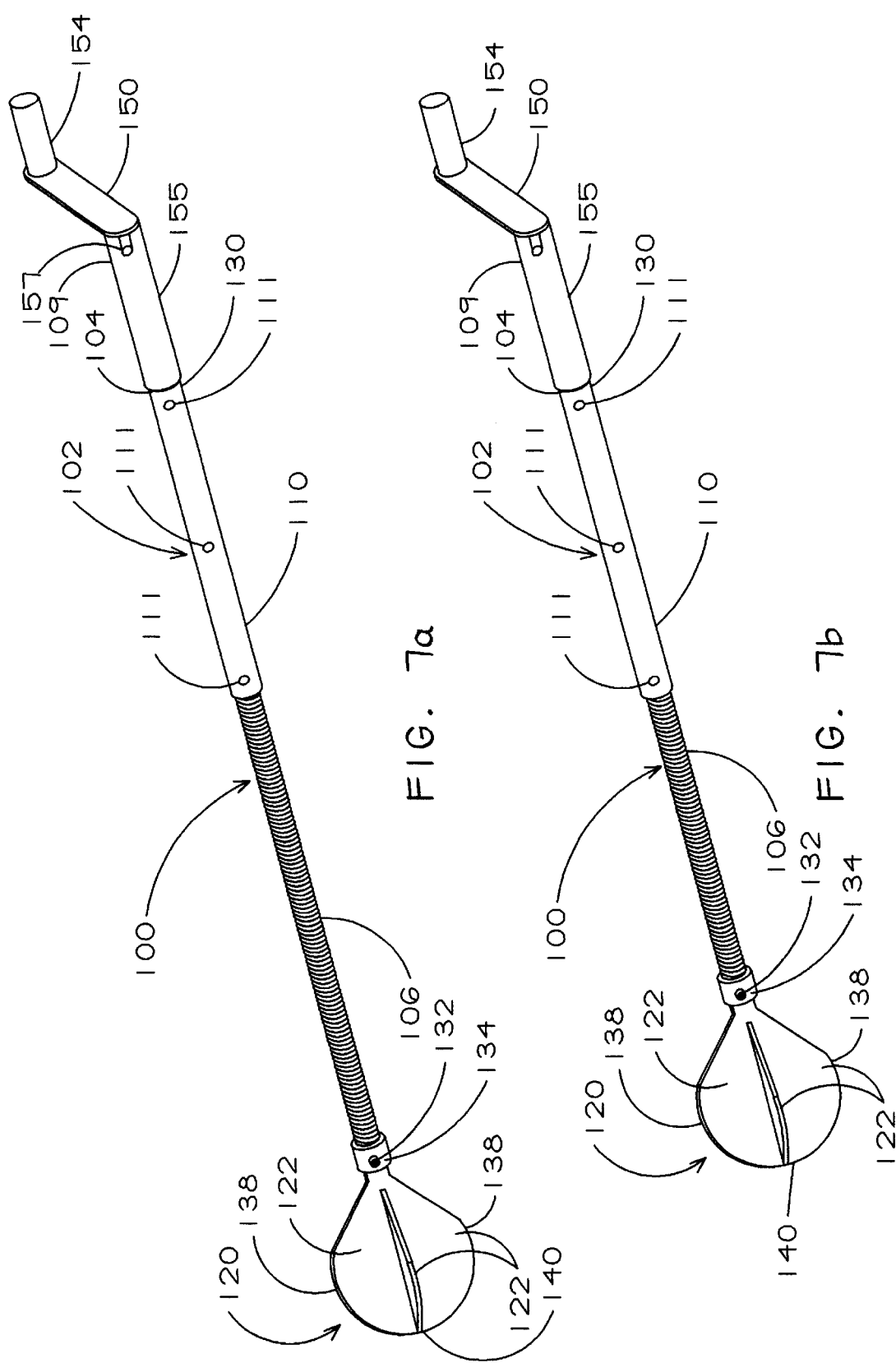
FIG. 7a is an isometric view of a tool used in carrying out the method of the present invention and including an operating head, a flexible shaft, and handles and with the tool in its fully extended position.
FIG. 7b is an isometric view similar to FIG. 7a but with the tool in its fully retracted position.
Figure 8:
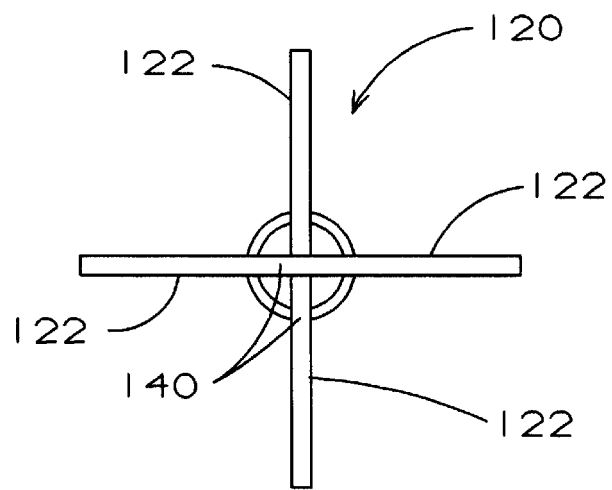
FIG. 8 is an enlarged end view of the operating head of the tool shown in FIGS. 7a and 7b.
Figure 9:
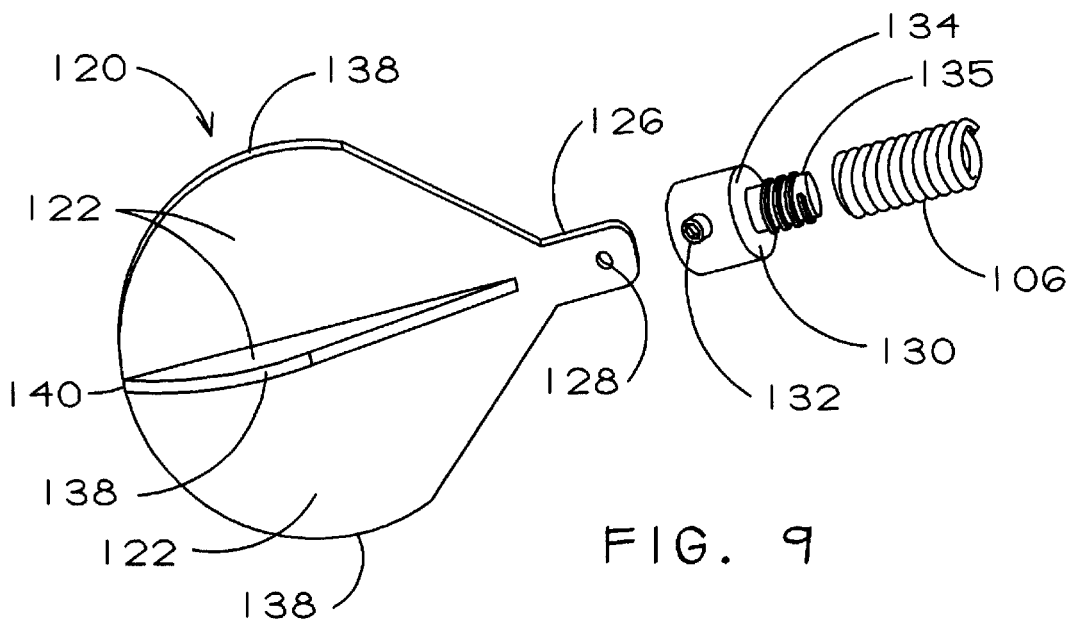
FIG. 9 is an enlarged, exploded isometric primarily of the operating head of FIGS. 7a and 7b with the shaft being shown fragmentarily and showing how the operating head is releasably pivotally connected to the shaft.
Figure 10:
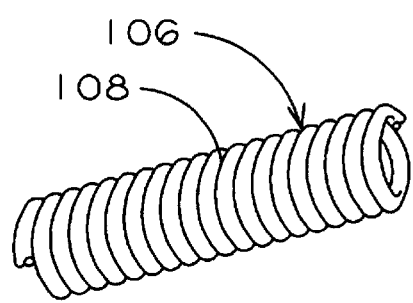
FIG. 10 is an enlarged isometric view of the shaft showing the turns of the coil spring construction of the shaft.

After the plumbing system 20 has passed the initial test at the rough-in plumbing stage, the cap 69b is replaced on the nipple 69a, and the construction of the building 88 continues (FIG. 6) including completion of the top-out plumbing job. As part of finishing the construction, the ground 42 around the building is filled and graded, leaving the riser 68 exposed above ground level to allow access to the clean-out 56 and the nipple 69a.

Figure 3:
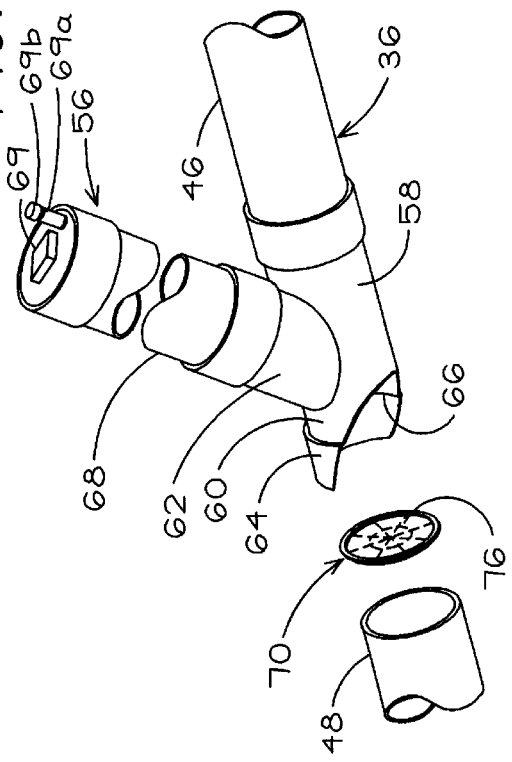
FIG. 3 is a still further enlarged view similar to FIG. 2 but with the parts assembled, thereby showing the clean-out connected between the upper and lower sections of the drain pipe and showing the test cap connected to the lower section between that section and the clean-out so as to block flow through the clean-out from the upper section of the drain pipe to the lower section thereof.
Figure 4:
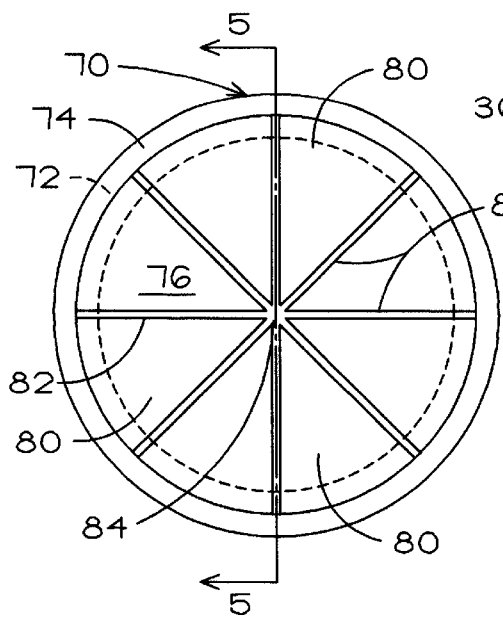
FIG. 4 is a still further enlarged face view of the test cap shown in FIGS. 2 and 3 as seen from the downstream side of the cap.
Figure 5:
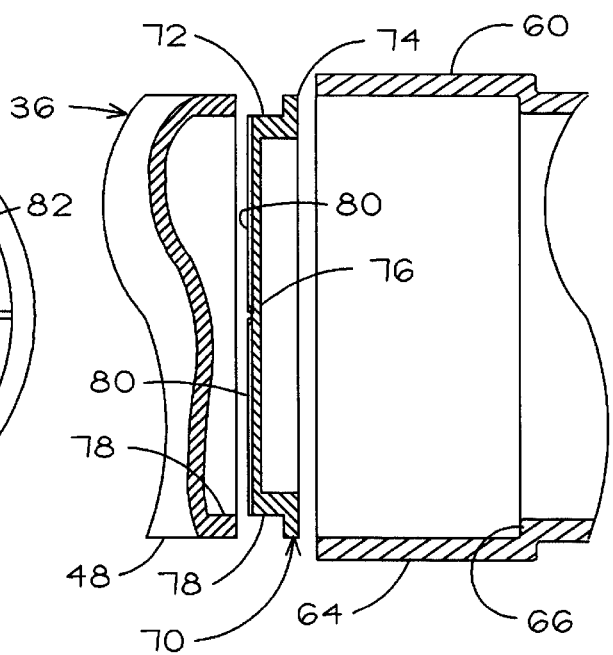
FIG. 5 is an exploded longitudinal diametrical section of the test cap taken on a plane indicated by line 5—5 of FIG. 4 and showing the test cap between the drain pipe and the clean-out and illustrating how these three parts will interfit when assembled.

During the completion of the building 88 (FIG. 6), the test cap 70, the clean-out 56 and the drain pipe 36 are not disturbed and thus remain connected in the described relationship (FIG. 3). After the top-out stage is completed, a second test of the plumbing system 20 is conducted by again pressurizing the system 20 through the nipple 69a, as above described. Once more, the test cap absolutely blocks flow through the drain pipe so that if there are any leaks, they will be in the system 20 and not in the test cap plugging the drain pipe. If the system is sound, only one additional test is needed, but of course if there are leaks, they must be repaired and the test repeated until all problems are corrected.

Following successful passage of the second or final test or tests, however, it is of course necessary to remove the blockage caused by the test cap 70. In accordance with the principles of the present invention, the blockage is removed by a special plumbing tool 100 (FIGS. 7a–11). This tool includes an elongated telescopic shaft 102 including a rigid, upper or rear cylindrical sleeve 104 and a flexible, lower or forward cylindrical shaft member 106 mounted for telescopic movement within the sleeve, as will be described. The sleeve is preferably made of steel or other strong, durable metals. The flexible shaft member is made of coiled wire and is thus tubular having open upper and lower ends. Adjacent turns 108 of the coil spring flexible member are in very close engagement whether the shaft member is flexed or unflexed, thereby imparting a measure of rigidity to the shaft member notwithstanding its considerable transverse flexibility in the length used. It is noted that the shaft member even in its fully retracted telescopic position can be manually transversely flexed into a full 360° bend and yet resiliently return to its perfectly straight unstressed condition. Moreover, even with the shaft in its fully extended telescopic position and supported horizontally like a fishing pole in use, the flexible shaft member is rigid enough to flex downwardly only about 45° from the horizontal. Coil springs suitable for the flexible shaft member are sold as part No. 9504 by the Marco Products Company of Sylmar, Calif. Alternatively, other types of flexible shafts or cables with the measure of rigidity described can be employed for the flexible shaft member.

As stated, the shaft 102 (FIGS. 7a, 7b, 9 and 11) is telescopic in that the flexible shaft member 106 is slidably mounted within the sleeve 104 for movement between extended positions, one of which is shown in FIG. 7a and retracted positions, one of which is shown in FIG. 7b. More specifically, the sleeve has open upper and lower ends 109 and 110 (FIG. 11), respectively, and a plurality of adjustment holes 111 longitudinally spaced (preferably equally) therealong and aligned lengthwise of the sleeve. A crank 112 includes an arm 150 connected to and projecting radially from the upper end of the shaft and a tubular crankhandle 154 mounted on the arm for free rotatable movement about the longitudinal axis of the crankhandle. The crankhandle extends rearwardly from the arm in offset, parallel relation to the shaft.

A tubular supporting handle 155 (FIGS. 7a, 7b, 9 and 11) is rotatably, coaxially mounted on the upper end 109 of the sleeve and is thus parallel to the crankhandle. The sleeve has an annular groove 156a (FIG. 11) spaced from the arm 150 by approximately the length of the supporting handle so that with the supporting handle on the sleeve, the groove is visible just outside the lower end of the supporting handle. A yieldably expandable split, retainer ring 156b is snap-fitted into the groove thereby retaining the supporting handle in its upper position on the sleeve but permitting rotation of the supporting handle relative to the sleeve. The supporting handle also has a U-shaped slot 157 opening out of its upper end and alignable with the uppermost adjustment hole upon rotation of the supporting handle to bring the uppermost hole and the slot into registry.

Figure 11:
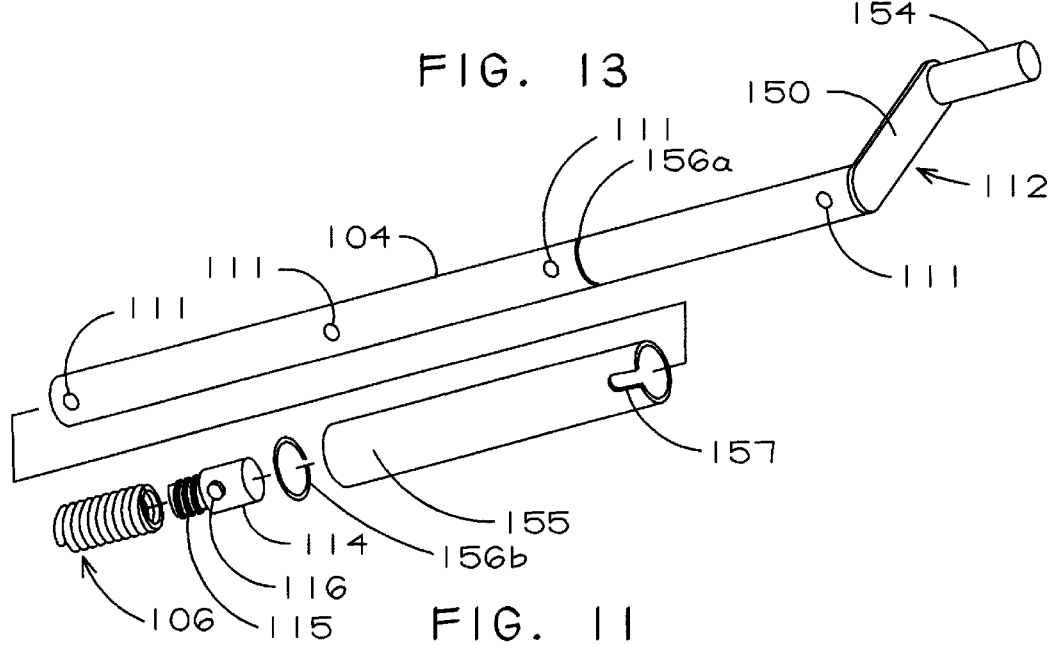
FIG. 11 is an enlarged exploded isometric view of the handle of the tool of FIGS. 7a and 7b and showing how the handle is connected to the shaft.

The flexible shaft member 106 is slidably mounted within the sleeve 104 by a cylindrical mounting block 114 having an outside diameter that will slidably fit within the sleeve. The mounting block also has a threaded end 1115 that is threaded into the open upper end of the flexible shaft member 106. An outwardly spring-urged detent 116 is fitted in the mounting block and is of a size to fit into any of the adjustment holes 111 or the slot 157. The detent may be manually pressed into a retracted position in the block so as to not to project from its periphery or released into an extended position wherein it projects out from the periphery, as shown in FIG. 11.

With the mounting block 114 attached to the flexible shaft member 106 (FIGS. 7a, 7b and 11) and with the detent 116 compressed into its retracted position, the block and the upper end of the flexible shaft member are slipped into the lower open end of the sleeve 104 and then slid upwardly therein. With the detent aligned with the adjustment holes 111 circumferentially of the sleeve, the detent will be spring-urged outwardly into its locking position in any hole that is selected and with which it becomes aligned, thereby releasably locking the flexible shaft member in selected positions within the sleeve and enabling the overall length of the shaft 102 to be adjusted. Normally, when the flexible shaft member 106 is fully retracted within the sleeve so that the detent is in the uppermost hole 111, the tool is in its storing condition, although it can be used in this position if the circumstances warrant such a short length. In normal use to remove a test cap as 70, however, the detent is retracted, and the flexible shaft member is pulled outwardly into one of its extended positions wherein the detent projects and locks into one of the lower holes. Locking in any of the holes other than the uppermost hole also frees the supporting handle 155 for rotation on the sleeve (or stated otherwise, frees the sleeve for rotation in the handle). This feature prevents rotation of the handle in the operator's grasping hand when the crank 112 and the attached sleeve 104 are rotated and makes the tool more comfortable to use. In its uppermost locked storing position, however, the detent 116 not only projects into the uppermost hole 111 but also into the slot 157 of the supporting handle 155 thereby locking this handle against rotation on the sleeve. Such locking facilitates carrying of the tool since rotation of the handle on the sleeve may make carrying and handling the long shaft 102 with its flexible, springy shaft member 106 somewhat unwieldy when not in use. The U-shaped slot 157 also allows the handle 155 to be slid downwardly on the sleeve past the detent in its uppermost locking position assuming that the retaining ring 156b is removed.

The plumbing tool 100 (FIGS. 7a–9 and 13) also includes an operating head 120 which may have various configurations depending on the application of the tool, including the head configuration of my prior copending application and my issued patent, both cited above; a head similar to the configuration of these prior documents but with another set of triangular blades on the back side of the mounting ring as well as on the front as disclosed; or a head 120 as shown in FIGS. 7a, 7b, 9 and 13 herein. The present head has a cruciform configuration (see FIG. 8) and is pivotally attached to the lower end of the flexible shaft member 106. This operating head has a pair of rigid, tear-drop or paddle-shaped operating elements providing a plurality of rigid blades 122 rigidly connected in the shape of a cross or plus sign. Alternatively, the head may be considered to be four semi-tear-shaped blades 122 joined in a cross configuration. The head also has a mounting stub 126 provided with an aperture 128.

For attaching the operating head 120 to the shaft 102, a coupling ring 134 (FIGS. 7a, 7b, 9 and 13) has a threaded upper end 135 that threads into the lower open end of the flexible shaft member 106. The coupling ring also has a lower recess that loosely receives the hub 126, and a pin 132 extends through the ring and into the aperture of the stub thereby pivotally connecting the operating head to the shaft 102. It will be understood that there may be different configurations and sizes of operating heads 120, depending on the diameter of the drain pipe involved, the particular blockage, the type of clean-out used, and other well-known factors. All of these may be pivotally connected to the shaft by the specific pivoted connection shown and described or by other pivoted connections as will be understood by those skilled in the art.

The blades 122 are rigidly joined to each other and are positioned in the four quadrants of the operating head 120. The blades have a tear-drop shape so as to provide smoothly curved reaming edges 138 that converge rearwardly to the mounting stub 126 and blend smoothly forwardly into curved forwardly convex penetrating edges 140. The maximum transverse dimension of the head at the reaming edges 138 of each coplanar pair of blades is approximately equal to the inside diameter of the annular body 72 of the test cap 70. The axial length of the head is such that when the head is in a drain pipe 36, the maximum transverse dimension of the head will be within the annular body 72 while the pivot axis at the pin 132 is still in line with the clean-out branch 62.

Operation and Method

The plumbing tool 100 (FIGS. 7a and 7b) is first adjusted to the desired length by depressing the detent 116 and adjusting the position of the flexible shaft member 106 to the desired extended or retracted position in the sleeve 104 and then allowing the detent to spring out into an aligned adjustment hole 111 in order to fix the overall length of the tool shaft 102 for the particular application. The tool is then held by grasping the supporting handle 155 in one hand and the crankhandle 154 in the other hand. The tool shaft and thus the operating head 120 are rotated by turning the crankhandle while holding the supporting handle, the shaft turning in the handle 155. Also, the tool shaft has sufficient axial rigidity to allow force to be transmitted through and axially of the shaft to the penetrating edges 140 by grasping the supporting handle in one hand and the crankhandle in the other and thrusting the tool axially of the tool shaft. Such rotation and axial thrusting can be accomplished at the same time whether the tool shaft is straight or flexed.

Before further describing the operation of the plumbing tool 100, brief reference is made here to the subject method described above for pressurizing the plumbing system 20 through the clean-out 56. The ability to use this method will be better understood after describing use of the plumbing tool 100. Moreover, the tool is used to carry out other method aspects of the present invention after all necessary pressure tests have been successfully completed. To this end, the cover 69 (FIG. 2) is removed, and the operating head 120 of the tool is inserted into the riser 68 and lowered down into the clean-out 56. The flexible shaft member 106 slidably engages the interior of the riser and the clean-out branch 62 and guides the operating head 120 down the clean-out until it exits the clean-out branch 62 and strikes the base of the outlet branch 60 of the clean-out (FIG. 13) whereupon the operating head 120 pivots over into the generally horizontal attitude shown in FIG. 13, with one or two of the blades 122 engaging the base of the outlet branch 60 of the clean-out 56 and the penetrating edges 140 pointing toward the test cap 70. Such generally horizontal positioning is facilitated not only by the pivotal connection of the head to the shaft and by also the transverse flexibility of the flexible shaft member and the engagement of this shaft member with the clean-out branch along area 170, but also by the downward slope of the drain pipe 36.

When in this generally horizontal position (FIGS. 12 and 13), further axial pressure on the tool shaft 102 causes the operating head 120 to move axially downwardly of the drain pipe 36 toward the test cap 70. Because of the combined transverse flexibility and axial rigidity of the tool shaft and the leveraging effect of the shaft bearing against the clean-out branch 62 and/or the riser 68 at region 170, this axial pressure on the tool shaft causes the penetrating edges 140 of the operating head to move into engagement with the center plate 76 of the test cap 70. Then, the shaft is thrust sharply axially downwardly to force the penetrating edges to break through the plate by causing the plate to rupture along the break lines 82, creating an initial hole 174 (FIG. 12) in the plate.

Thereafter, while continuing to apply axial downward pressure on the tool shaft 102 (FIG. 13), the tool shaft and the operating head 120 are rotated with the crankhandle 154 to begin reaming away the center plate 76 and annular body 72 of the test cap 70 with the reaming edges 138 of the operating head. Within seconds the reaming blades will have substantially completely reamed out or cut away the center plate and the annular body to provide a large opening 180 (FIG. 14) in the test cap. The diameter of this opening 180 is substantially the same as the inside diameter of the lower section 48 of the drain pipe since the maximum diameter of the operating head at the reaming edges is about the same as, but slightly less than, the inside diameter of the lower section 48. In this manner, the opening 180 will allow waste material to move essentially unimpeded through the pipe.

After the opening 180 has been created, the tool 100 is pulled back out of the outlet branch 60 and thence out of the clean-out branch 62 and riser 68. Because of the smooth curvature of the tear-drop-shaped blades 122, the operating head 120 slides right back out of the test cap 70, drain pipe 36, and the clean-out and does not hang-up or become locked in the test cap, drain pipe or clean-out. It is also to be noted that the cut fragments, not shown, of the center plate are subsequently flushed down the lower section 48 of the drain pipe to the sewer line 38.

Having understood how the subject test cap 70 and tool 100 are used, it will also be understood how the method of pressurizing the plumbing system 20 through the clean-out 56 is made possible. Since there is no inflatable test plugs or so-called water-weenie to block the clean-out, pressurization is most conveniently carried out through the clean-out, thereby avoiding having to pressurize the system through a roof vent.

From the foregoing it will be understood that an improved method for testing a newly installed plumbing system has been provided including a tool 100 used in carrying out the method. The method is more cost-effective because it avoids having to re-test a plumbing system 20 that would have passed the test but did not only because the test plug failed. Since the method does not use inflatable test plugs to seal off the drain pipe 36 while doing the testing, the common failure of the inflatable plug does not cause a failed test. Instead, the method involves use of a test cap which positively seals the drain pipe and allows an accurate test of the plumbing system. The test cap and its positive seal can be employed because the method also uses the tool 100 that can be extended into the clean-out and operated from a remote position to penetrate the cap and ream out an opening 180 in the cap thereby to remove the blockage from the pipe. It will be recognized that although the method and tool have been described and shown with an underground clean-out, they can be used equally as well when the clean-out is in a basement or otherwise above ground.

It will also be more generally recognized that since, as stated above, the test cap 70 is a blockage in the line, the tool is useful not only for removing test caps but also any such blockage that is so fixed or secured in the line that it prevents, either partially or completely, fluid flow therethrough.

Although a preferred embodiment of the present invention has been shown and described, various modifications and substitutions may be made thereto without departing from the spirit and scope of the invention. Accordingly, it is to be understood that the present invention has been described by way of illustration and not limitation.

What is claimed is:

1. A plumbing tool for creating an opening through a blockage in a line, comprising:

an operating head having blades capable of penetrating and reaming out such a blockage that is sealed in a line;

a rotatable shaft having an axially and transversely rigid upper tubular crankshaft and a transversely flexible and axially rigid lower tool shaft, the tool shaft being a tightly wound coil spring telescopically received in the crankshaft, having an upper end connected to the crankshaft, and having a lower end transversely flexibly connected to the operating head, the spring in use extending from the crankshaft approximately one-half the overall length of the shaft when the shaft is fully telescopically extended, the spring extending along a substantially straight line from its upper end throughout a substantial part of its length but being capable of flexing transversely of said line throughout the remainder of its length to its lower end;

a tubular handle rotatably receiving the upper portion of the shaft; and a cranhandle connected to the upper end of the crankshaft, the spring being capable of transmitting thrust to the head caused by force directly applied to the shaft with the crankhandle, said thrust being transmitted along the substantially straight part of the spring and thence along said remainder of the spring to the head in both the rotating and non-rotating conditions of the shaft, said transmitted thrust being great enough to allow the blades of the head to penetrate the blockage without rotating the shaft and being present to assist the blades to ream out the blockage during rotation of the shaft.

2. The tool of claim 1, wherein the operating head is pivotally connected to the lower flexible portion of the shaft.

3. The tool of claim 1, wherein the coil spring is slidable relative to the crankshaft between longer extended positions and shorter retracted positions; and wherein there is a locking mechanism locking the coil spring and the crankshaft in selected extended or retracted positions.

4. The tool of claim 1, wherein the operating head has an axis of rotation and includes a plurality of blades radially extending from the axis in circumferentially spaced relation to each other; and wherein the blades have arcuate outer edges.

5. The tool of claim 4, wherein the blades have a semi-tear-shape projecting outwardly from the axis of the head.

6. The tool of claim 4, wherein the outer edges of the blades have lateral reaming edge portions and forward penetrating portions.

7. A tool for making an opening through a blockage in a flow line that is blocking flow therethrough and wherein a branch laterally connected to and extending from the line provides access to the blockage, comprising:

an operating head having semi-tear-shaped reaming blades projecting radially outwardly from an axis of rotation of the head, the blades having lateral arcuate edges and forward arcuate edges;

a telescopic shaft having a lower transversely flexible coil spring portion and a tubular upper rigid sleeve portion having an internal diameter larger than the outside diameter of the spring, the sleeve portion slidably receiving the spring portion for movement inwardly and outwardly in the sleeve portion into various relative positions, the coil spring portion having a longitudinal axis;

a locking mechanism locking the portions in selected positions;

a joint between the coil spring portion and the head allowing the head to move relative to the coil spring portion so that the axis of rotation of the head can be angulated relative to the axis of the coil spring portion, the telescopic shaft being capable of extending the head into the branch and positioning it in the line adjacent to the blockage and the joint being capable of enabling the head to be generally centered on the blockage by the operator handling the shaft extended through the branch, the shaft having axial rigidity between the upper rigid portion and the joint, the shaft being characterized in its ability to apply axial force from the upper rigid portion to the lower flexible portion to the joint with a force sufficient to penetrate such a blockage with the head and further being characterized in its ability to apply rotary force to the shaft and thus the head with a force sufficient to ream out the blockage;

a crankhandle connected to the sleeve portion; and a tubular handle rotatably receiving the sleeve portion adjacent to the crankhandle.

8. The tool of claim 7, wherein the locking mechanism is a detent on one of the portions and holes in the other portion releasably receiving the detent and locking the two portions in selected positions of extension relative to each other.

9. A plumbing tool for removing a blockage from a plumbing line, comprising:

an operating head having an axis of rotation and reaming blades thereon projecting outwardly from the axis;

a shaft having a lower transversely flexible portion and an upper portion, the lower portion having a longitudinal axis;

a joint connecting the head and the flexible portion of the shaft with the blades extending endwardly of the shaft, the shaft being adapted to position the head in the line adjacent to the blockage, the joint allowing movement of the head relative to the flexible portion into various angulated positions of said axis of rotation relative to said longitudinal axis in order generally to align the axis of the head with the center of the blockage, the shaft being characterized in its ability to apply axial force from the upper portion to the lower flexible portion to the joint with a force sufficient to penetrate such a blockage with the head and further being characterized in its ability to apply rotary force to the shaft and thus the head with a force sufficient to ream out the blockage;

a tubular handle rotatably receiving the upper portion of the shaft; and a crankhandle connected to the rigid portion of the shaft.

10. A tool for making an opening through a blockage in a fluid-carrying line that is blocking flow therethrough and wherein a lateral branch connected to the line provides access to the blockage, comprising:

an operating head having a teardrop configuration capable of penetrating and reaming an opening through the blockage;

an elongated shaft having a longitudinal axis and having an upper rigid sleeve and a lower tightly wound coil spring pivotally connected to the operating head for extending the head into the branch and into engagement with the blockage and generally centered thereon, the shaft being resiliently flexible and bendable transversely of the axis along the coil spring from a straight condition into a flexed condition when the spring is subjected to force imposed transversely of said axis so that when the spring is in the branch and the head is in the line adjacent to the blockage, the spring is extended along a substantially straight line in the branch from the sleeve throughout a substantial part of the length of the spring but is capable of flexing in the transition from the branch to the fluid-carrying line and the head is pivoted relative to the shaft to enable the generally centered engagement of the operating head with the blockage, the shaft having axial rigidity whether straight or flexed so that the shaft is also capable of exerting force axially on the operating head and against the blockage to penetrate through the blockage; and a handle connected to the shaft for manually rotating the shaft while in its flexed condition and for manually axially forcing the operating head against the blockage thereby to cause the operating head first to penetrate and then to ream out an opening in the blockage so that the line is open and provides a passageway permitting flow therethrough, the spring being capable of transmitting thrust to the head caused by force directly applied to the shaft with the handle, said thrust being transmitted along the substantially straight part of the spring and thence along said remainder of the spring to the head in both the rotating and non-rotating conditions the shaft, said transmitted thrust being great enough to allow the blades of the head to penetrate the blockage without rotating the shaft and being present to assist the blades to ream out the blockage during rotation of the shaft.

11. An operating head for a plumbing tool capable of penetrating and reaming out a test cap from a drain line through a clean-out, the drain line having an internal surface, comprising:

circumferentially spaced blades in a cruciform shape projecting radially outwardly from an axis of rotation of the head and having forward and rearward ends, each of the blades having a semi-teardrop shape with arcuate outer edges adapted to engage the internal surface of the line; and a mounting stub projecting rearwardly from the blades along said axis and adapted to position the head in the line in opposed relation to the test cap so that the axis of the head is generally centered on the cap, wherein the arcuate edge of each blade curves smoothly outwardly and longitudinally of said axis from the mounting stub along a lateral reaming segment of the edge and thence curves smoothly transversely inwardly of the axis along a penetrating segment of the edge, and the penetrating segments of all of the edges meeting forwardly of the head at said axis and at the opposite end thereof from the mounting stub and defining a pair of forward arcuate edges each of which joins its respective lateral reaming edges around generally the same center whereby the test cap can be penetrated by the penetrating segments and then reamed out by the reaming segments.

12. A method for testing a plumbing installation wherein a clean-out extends from a drain line of the installation and wherein the clean-out has a branch extending from the drain line, comprising the steps of:

bonding a disc in fluid-tight relation in the drain line on the downstream side of the clean-out, the disc having at least one weakened break line therein dividing the disc into segments;

testing the installation under pressure against the disc;

after said testing step if there are no leaks, inserting into the branch a tool having an upper handle, an elongated shaft projecting from the handle, and an operating head with penetrating and reaming blades thereon, the shaft having a lower resiliently transversely flexible portion angularly movably connected to the head and having axial rigidity when flexed or straight;

positioning the head opposite to the disc with the lower flexible portion against the branch of the clean-out and with the angularly movable connection of the shaft to the head so that the head is generally aligned with the disc;

moving the head into engagement with the disc by leveraging the flexible portion against the branch and angulating the head on the flexible portion;

axially downwardly thrusting the tool thereby causing the blades to separate the segments along the break line and thereby to penetrate the disc; and rotating the shaft and thus the head against the disc or remaining portions thereof with the handle.

13. The method of claim 12 wherein the shaft is telescopically adjustable in length, including the further steps of:

adjusting the length of the shaft prior to inserting the tool in the branch.

14. The method of claim 12, wherein the blades have smoothly curving penetrating and reaming edges, including the additional steps of:

inserting the tool down the branch of the clean-out to position the penetrating and reaming edges into engagement with the disc;

penetrating the disc with the penetrating edges of the tool;

reaming out the disc with the reaming edges of the tool; and withdrawing the tool from the branch with the smooth edges sliding back out along the drain line or clean-out.

15. A method of using a manually operated tool to provide an opening through a test plug after the plug is used to block a line of a plumbing system during a test for leaks and after the test has been successfully completed with no leaks occurring, the plug preventing flow through the line while the system on one side of the plug is tested for leaks, the test plug having separable segments that are adjacent to each other, and a weakened break area joining adjacent segments; wherein the plumbing system has a clean-out extending from the pipe, communicating with the flow passage, and providing access to the test plug; and wherein the tool includes an elongated flexible, rotatable shaft and a test-plug-penetrating and reaming head connected to the shaft and axially movable and rotatable therewith, comprising the steps of:

manually grasping the tool and inserting the head and the shaft into the clean-out until the head is in the flow passage in opposed relation to the test plug;

manually axially pressing on the shaft to force the head against the test plug and to cause the segments to be separated along the break area; and manually rotating the shaft while in engagement with the test plug to ream out an opening through the test plug, so that the flow passage is at substantially its normal inside diameter.

16. A plumbing tool for creating an opening in a blockage in a line, comprising:

an operating head having penetrating and reaming blades;

a telescopic shaft having a lower transversely flexible portion connected by a flexible joint to the operating head and an upper rigid portion, the shaft having axial rigidity in both its upper rigid portion and its lower flexible portion, the shaft and the flexible joint constituting means for positioning the head in the line, for angulating the head so that it is generally aligned with the blockage, for applying an axial force sufficient to penetrate such a blockage with the head, and for also simultaneously applying rotary and axial force to the head sufficient to ream out the blockage and provide an opening therethrough;

a tubular handle rotatably receiving the rigid portion of the shaft; and a crankhandle connected to the rigid portion of the shaft.

17. A method of testing a plumbing installation having a clean-out that includes a branch providing access to fluid-carrying line of the installation, comprising the steps of:

providing a fluid-tight blockage in the line on the downstream side of the clean-out, the blockage being a test disc that has a plurality of weakened break areas creating fragmentable segments in the disc;

pressurizing the installation to test for leaks;

after said pressurizing step and establishing that there are no leaks, accessing the disc through the branch of the clean-out with an elongated flexible tool having a rotatable head with penetrating and reaming edges;

inserting the tool down the branch and positioning the penetrating edges into engagement with the disc while leveraging the tool against the clean-out;

penetrating through the weakened break areas with the penetrating edges by axially downwardly thrusting the shaft, while slidably leveraging the shaft against the clean-out and thereby forcing the head against and through the disc to separate the segments from the remainder of the disc; and reaming out the remainder of the disc with the reaming edges by rotating the shaft.

18. A method of using an operating head to remove a penetrable, segmented disc from a drain line through a clean-out that provides access to the disc, the disc being sealed in the line and blocking flow therethrough, the drain line having an inside wall and a predetermined inside diameter, there being non-smooth transition areas in the line and clean-out, the operating head having at least three planar blades projecting radially outwardly in substantially equally circumferentially spaced relation from an axis of rotation of the head to outwardly directed edges, the head having forward and rearward ends and a maximmun diameter approximately equal to the inside diameter of the drain line, each edge having a forward segment and a rearward segment, the forward segments of all the blades converging forwardly of the head, and the rearward segments being convex and extending rearwardly of the head, comprising the steps of:

extending the head through the cleanout and into the drain line;

orienting the axis of the head into substantial alignment with the center of the disc while sliding the edges of the blades along the inside wall of the drain line and tilting said axis into generally centered relationship with the disc;

penetrating the disc with the forward segments of the blades and thereby separating the segments of the disc from a portion thereof with rough edges remaining in the line;

rotating the blades against the remaining portion of the disc and thereby smoothing out said rough edges; and removing the head from the line and clean out with the rearward segments of the blades sliding over the transition areas whereby the head is withdrawn from the line and clean-out without becoming stuck therein.

19. An operating head for a plumbing tool capable of penetrating and reaming out a disc from a drain line through a clean-out without hanging up in the line or clean-out during insertion into and removal from the line and clean-out, comprising:

at least three planar blades projecting radially outwardly in substantially equally circumferentially spaced relation from an axis of rotation of the head to outwardly directed edges, the head having forward and rearward ends and a maximum diameter approximately equal to the inside diameter of the drain line, each edge having a forward segment and a rearward segment, the forward segments of all the blades converging forwardly of the head, and the rearward segments being convex and extending rearwardly of the head; and a connector stub projecting rearwardly from the blades along said axis of rotation and providing a pivoting axis that is substantially perpendicular to said axis of rotation.

20. An operating head for a plumbing tool capable of penetrating and reaming out a disc from a drain line through a clean-out without hanging up in the line or clean-out during insertion into and removal from the line and clean-out, comprising:

four planar blades projecting radially outwardly in substantially equally circumferentially spaced relation from an axis of rotation of the head to outwardly directed edges, whereby there are a first pair of blades in a first plane and second pair of blades in a second plane at right angles to the first plane, the head having forward and rearward ends and a maximum diameter approximately equal to the inside diameter of the drain line, each edge having a forward segment and a rearward segment, the forward segments of all the blades converging forwardly of the head, and the rearward segments being convex and extending rearwardly of the head, the edges of each pair of blades transitioning from their rearward segments along continuous, smooth convex curvatures to and throughout their forward segments, whereby the forward segments of both pairs of blades have smooth convex curvatures and define a blunt forward end of the head.

21. The head of claim 20, wherein each blade has a substantially semi-tear drop shape.

* * * * *